(12) United States Patent
Wagner et al.

(10) Patent No.: US 8,313,146 B2
(45) Date of Patent: Nov. 20, 2012

(54) STOWABLE VEHICLE SEAT

(75) Inventors: Uwe Wagner, Wermelskirchen (DE); Carsten Schauf, Köln (DE); Herbert Tiefert, Pulheim (DE); Robert Spahl, Cologne (DE)

(73) Assignee: Ford Global Technologies, LLC, Dearborn, MI (US)

( * ) Notice: Subject to any disclaimer, the term of this patent is extended or adjusted under 35 U.S.C. 154(b) by 387 days.

(21) Appl. No.: 12/690,327

(22) Filed: Jan. 20, 2010

(65) Prior Publication Data
US 2011/0175411 A1    Jul. 21, 2011

(51) Int. Cl.
B60N 2/02    (2006.01)

(52) U.S. Cl. ............. 297/378.1; 297/234; 297/236; 297/344.1

(58) Field of Classification Search ............ 297/61, 297/232, 234, 236, 340, 344.1, 378.1, 15
See application file for complete search history.

(56) References Cited

U.S. PATENT DOCUMENTS

| | | | |
|---|---|---|---|
| 6,192,565 B1* | 2/2001 | Tame | 297/61 |
| 6,811,200 B2* | 11/2004 | Shibata et al. | 296/64 |
| 6,997,498 B2* | 2/2006 | Oyama | 296/65.05 |
| 7,270,361 B2* | 9/2007 | Oishi et al. | 296/65.03 |
| 7,490,896 B2* | 2/2009 | Smith | 297/235 |
| 2003/0214169 A1* | 11/2003 | Schambre et al. | 297/410 |
| 2008/0157579 A1* | 7/2008 | Yajima et al. | 297/378.1 |
| 2008/0185893 A1* | 8/2008 | Behrens et al. | 297/378.1 |
| 2008/0252121 A1* | 10/2008 | Smith | 297/236 |
| 2009/0008975 A1* | 1/2009 | Behrens et al. | 297/236 |
| 2011/0062738 A1* | 3/2011 | Lindley et al. | 296/65.09 |

FOREIGN PATENT DOCUMENTS

| | | |
|---|---|---|
| DE | 4337938 C1 | 5/1995 |
| DE | 19925306 A1 | 12/2000 |
| DE | 10344569 A1 | 4/2004 |
| DE | 202005019374 U1 | 3/2006 |
| DE | 102005005345 A1 | 8/2006 |
| DE | 102005056570 A1 | 5/2007 |
| DE | 112005003122 T5 | 10/2007 |
| DE | 102007005143 A1 | 8/2008 |
| DE | 102007055144 A1 | 5/2009 |
| EP | 1632389 A2 | 3/2006 |
| GB | 2323526 * | 9/1998 |
| JP | 2002-225603 A | 8/2002 |
| WO | WO2008/104333 * | 9/2008 |

* cited by examiner

*Primary Examiner* — David Dunn
*Assistant Examiner* — Philip Gabler
(74) *Attorney, Agent, or Firm* — Raymond L. Coppiellie; Price Heneveld LLP

(57) ABSTRACT

A vehicle seat is provided, particularly for a center seat in a row of seats. The seat includes a back part swivel connected to a seat part so that the back part and seat part swivel away from each other in a seating position and swivel toward one another in a first stowage position. The seat back may be altered in its longitudinal extent between the first stowage position and a second stowage position such that the seat back has a seat length and a shorter stowage length. The seat further includes a traveling mechanism which automatically moves the back part longitudinally from the seat length to the shorter stowage length when the back part is folded into the first stowage position.

19 Claims, 15 Drawing Sheets

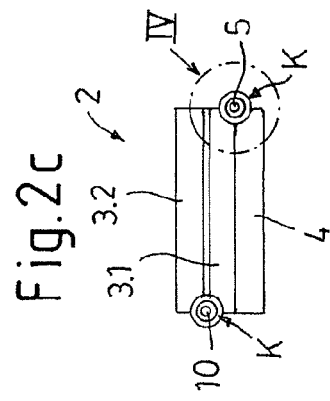
Fig.2a
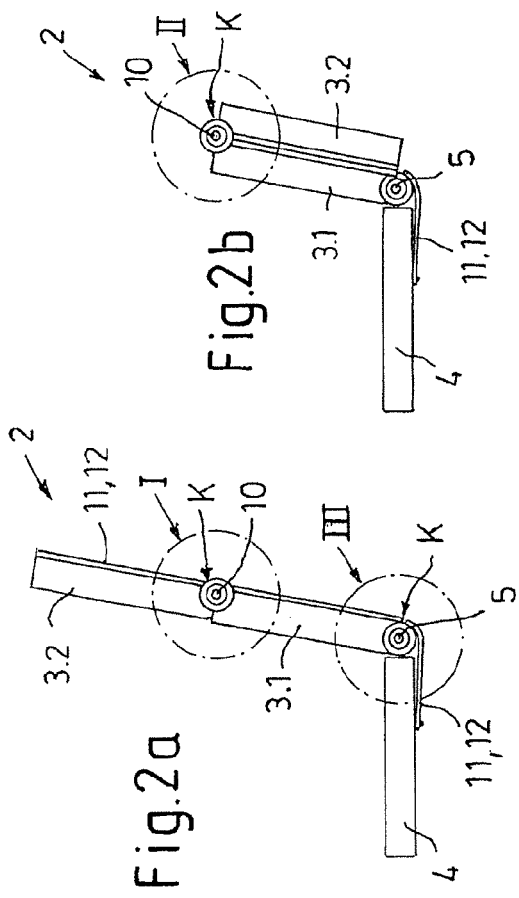
Fig.2b
Fig.2c
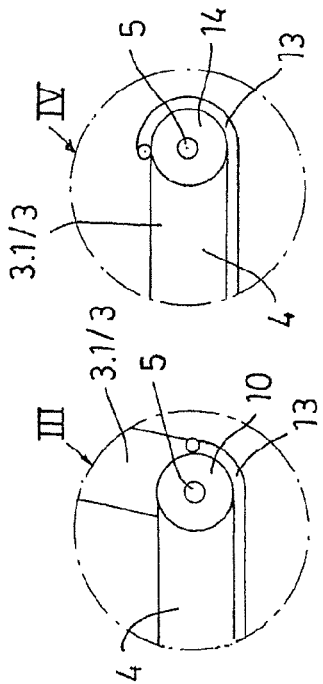
Fig.2d
Fig.2e
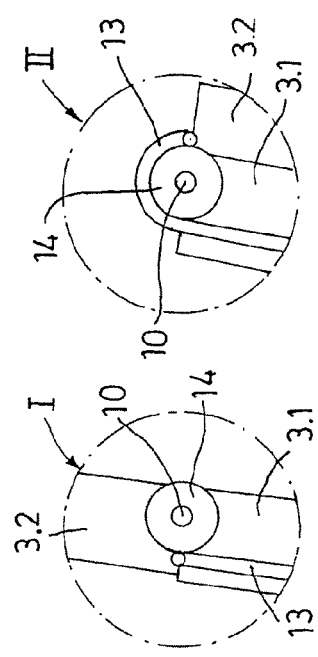
Fig.2f
Fig.2g

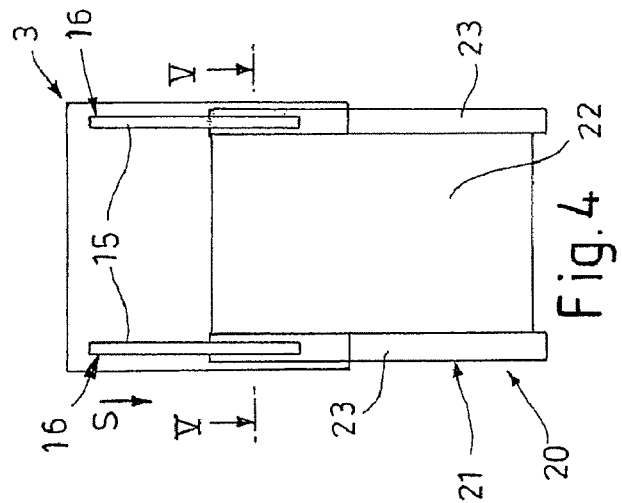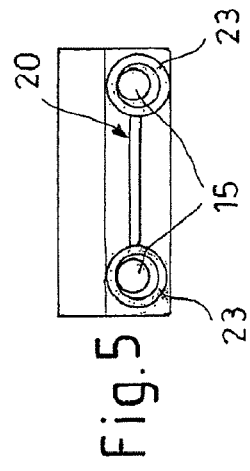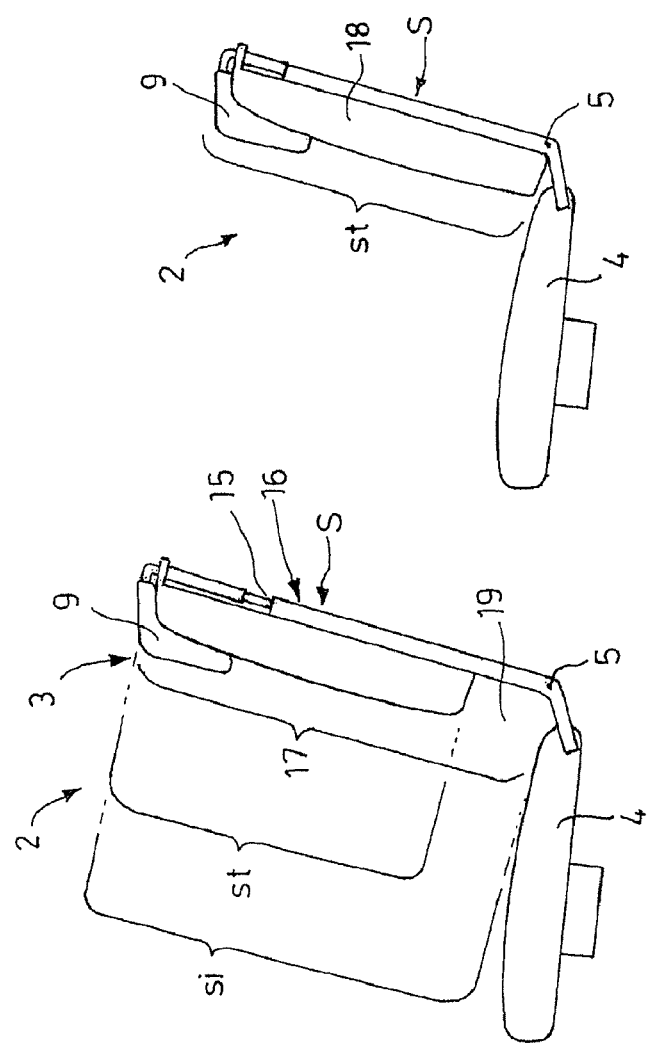

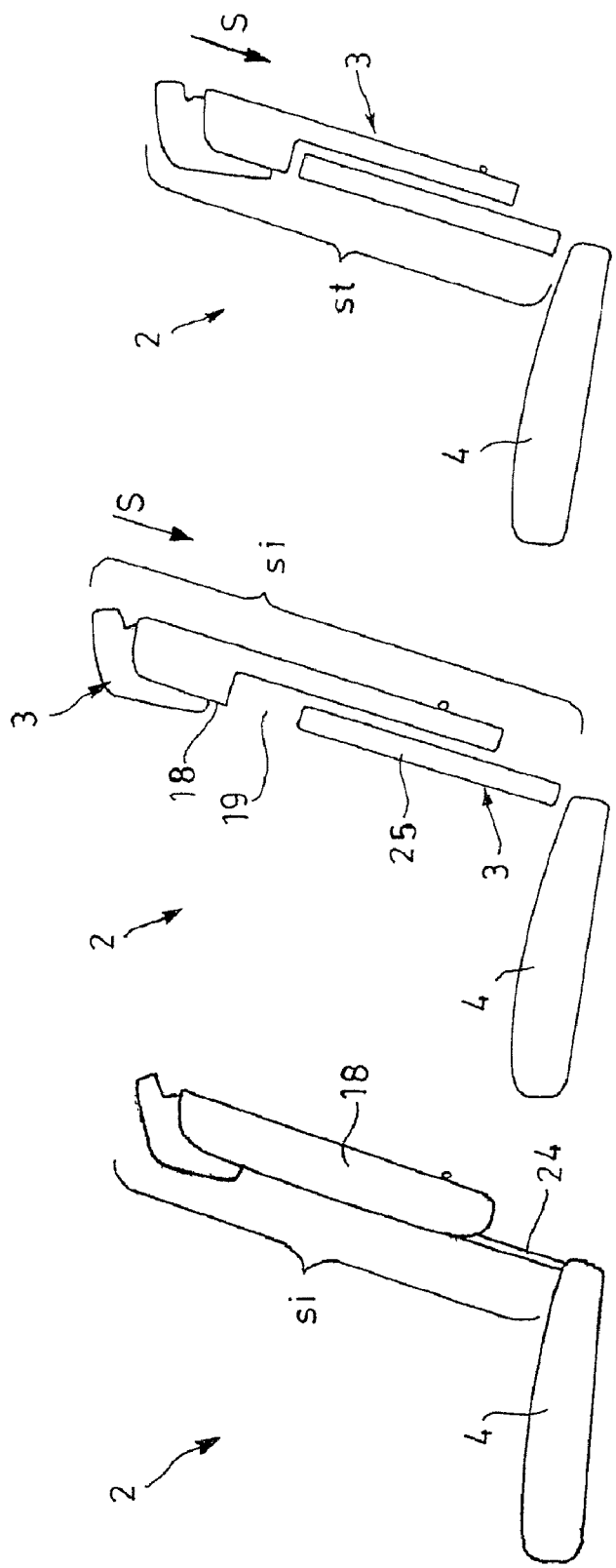

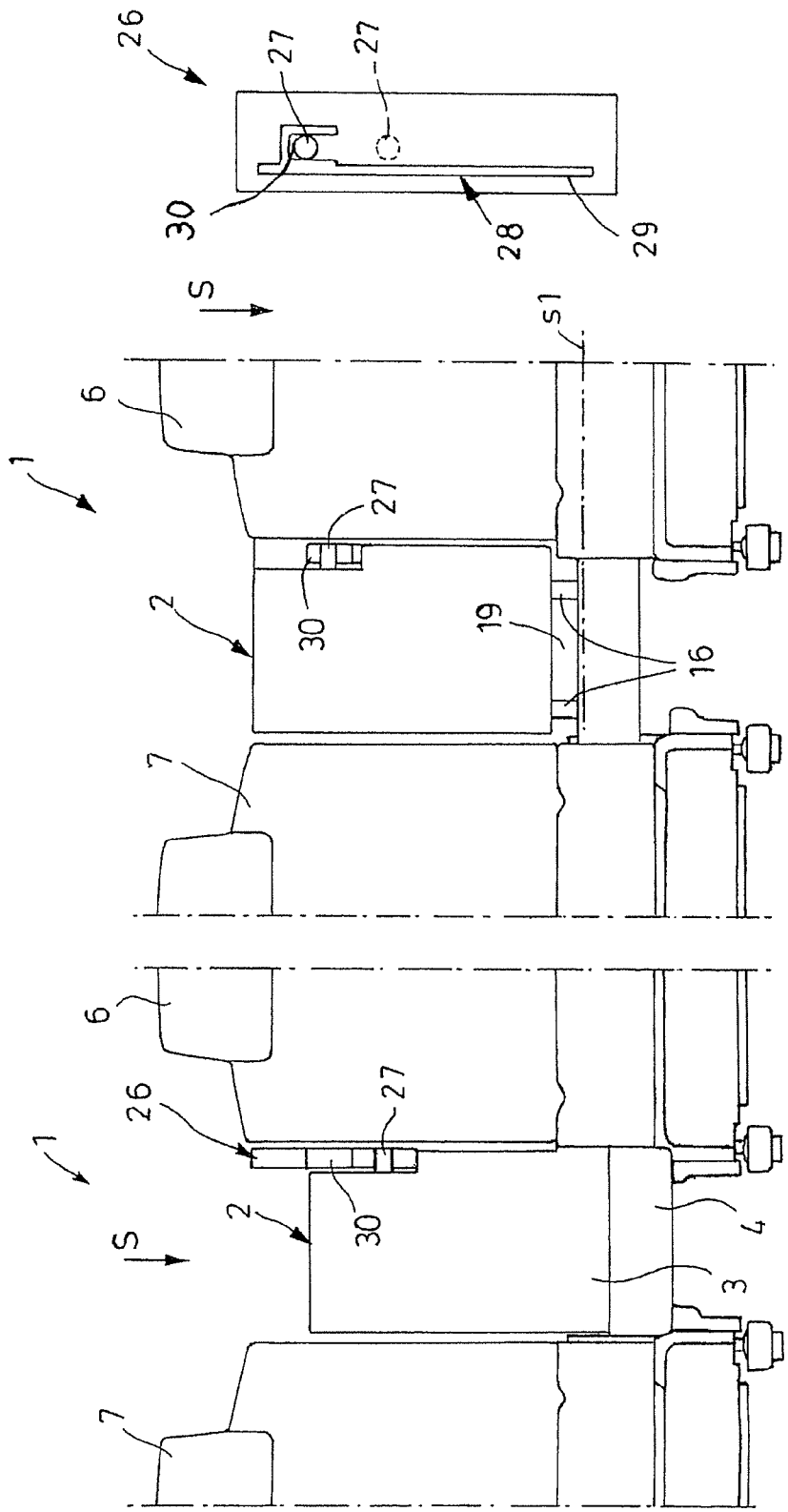

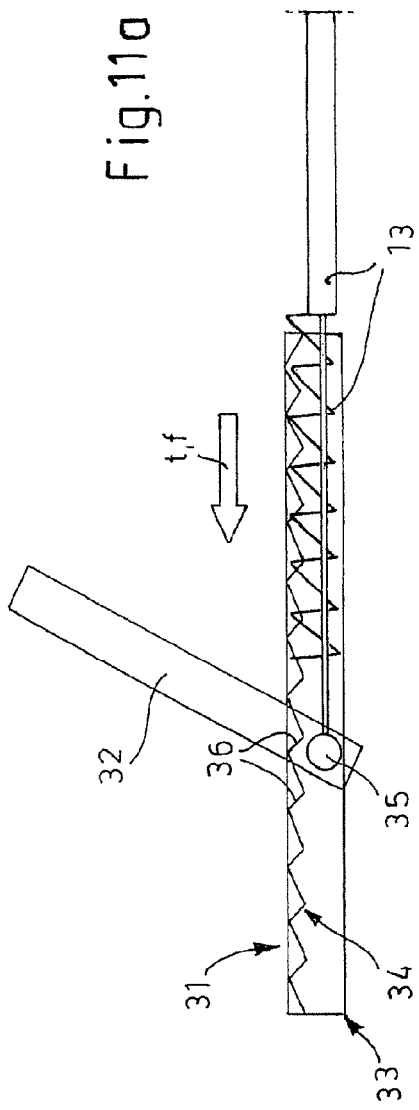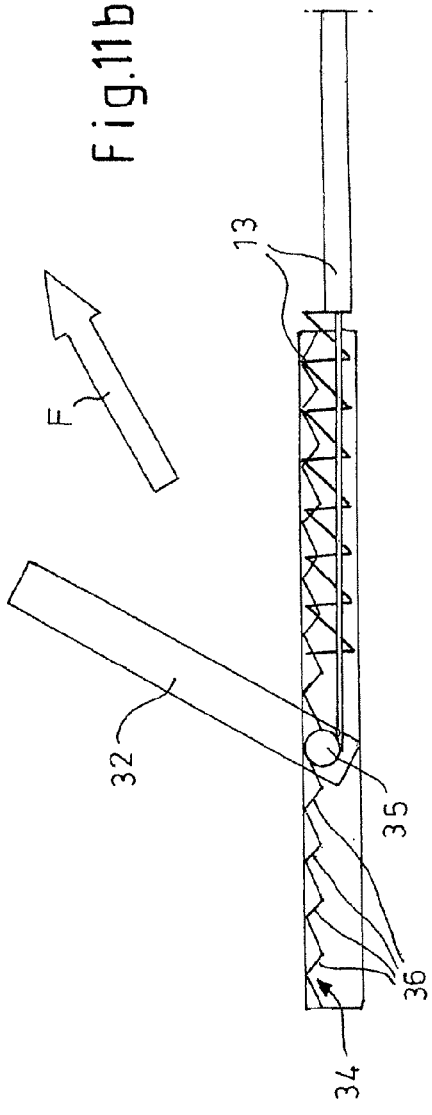

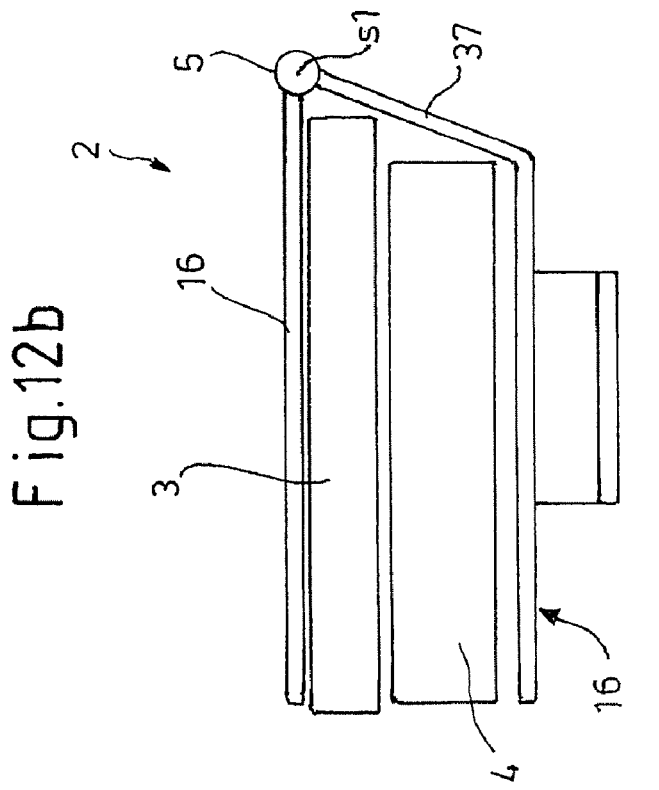
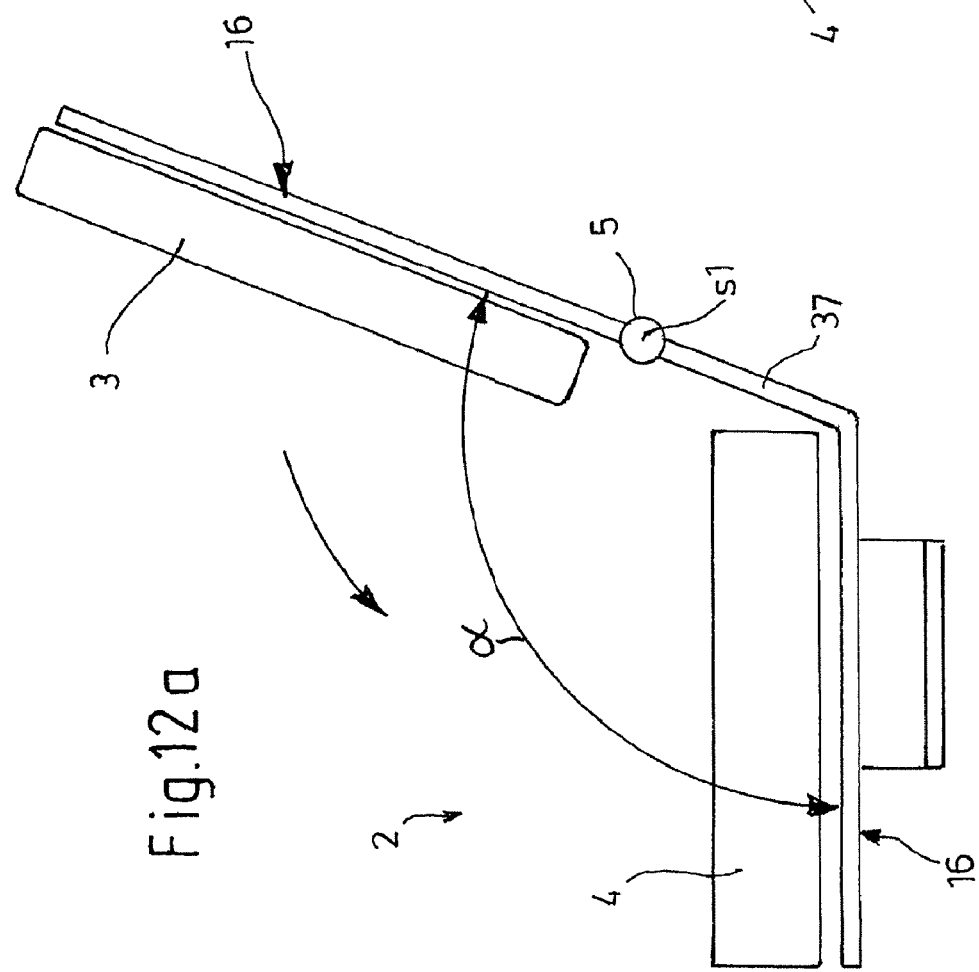
Fig.12a
Fig.12b

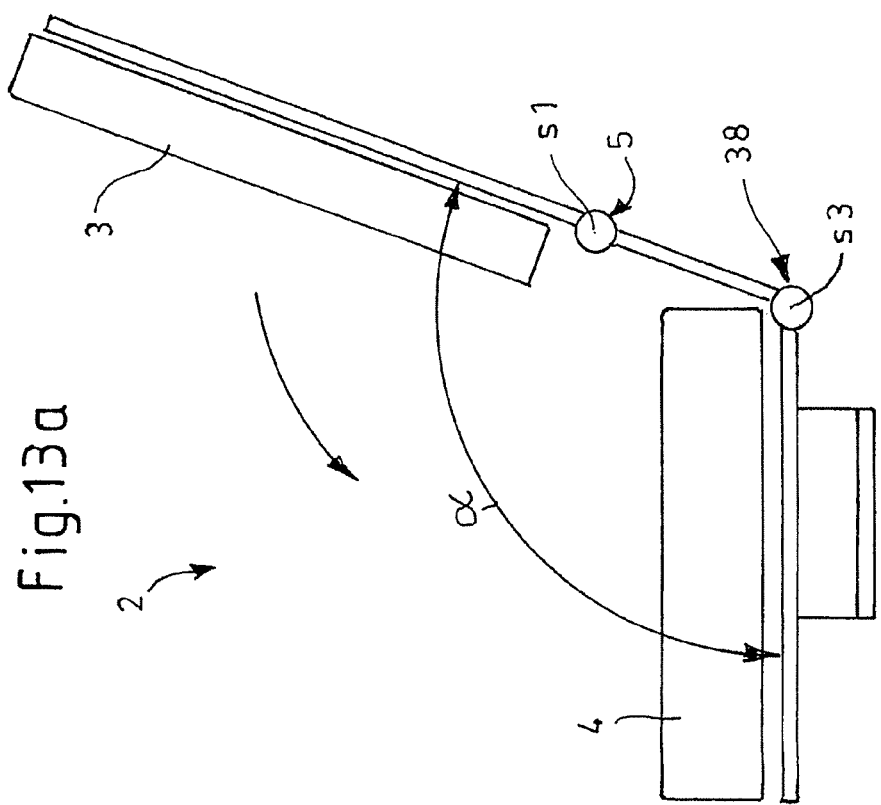
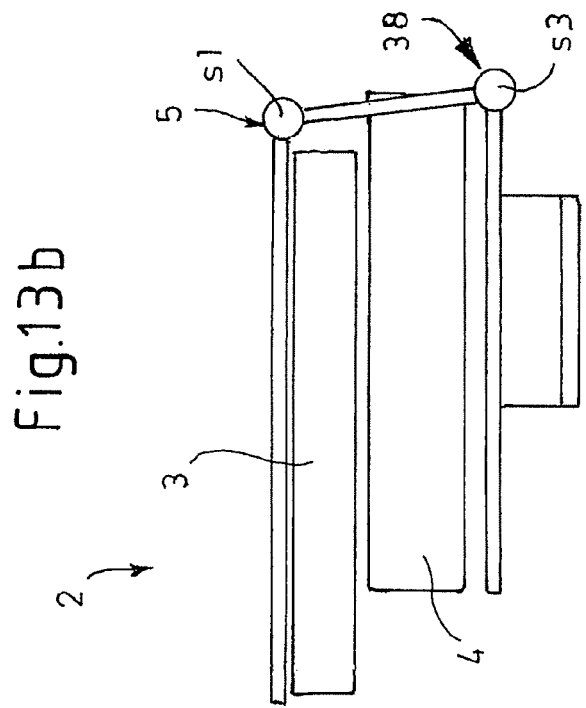
Fig.13a
Fig.13b

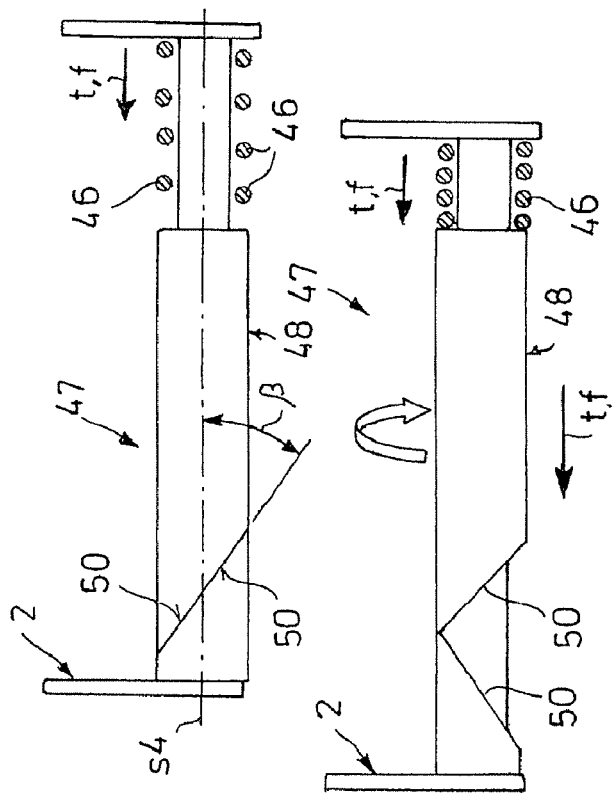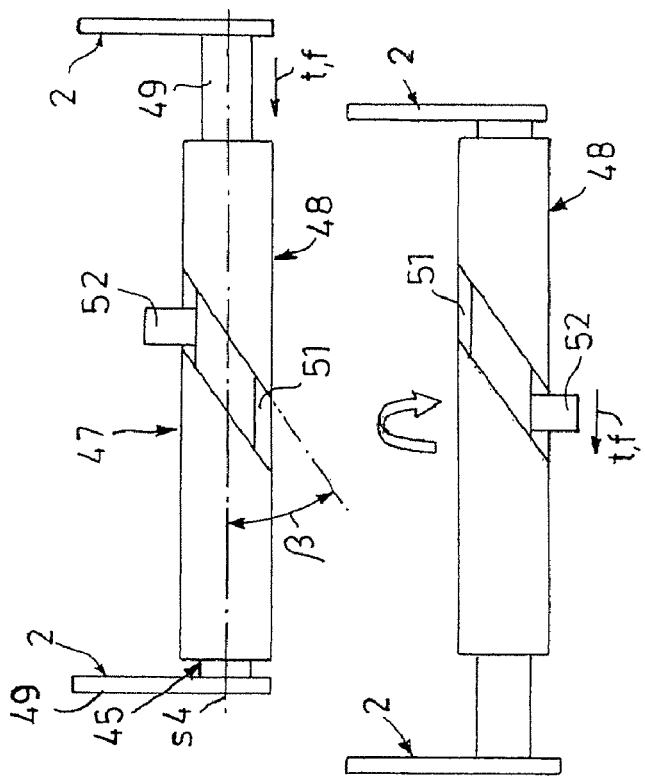

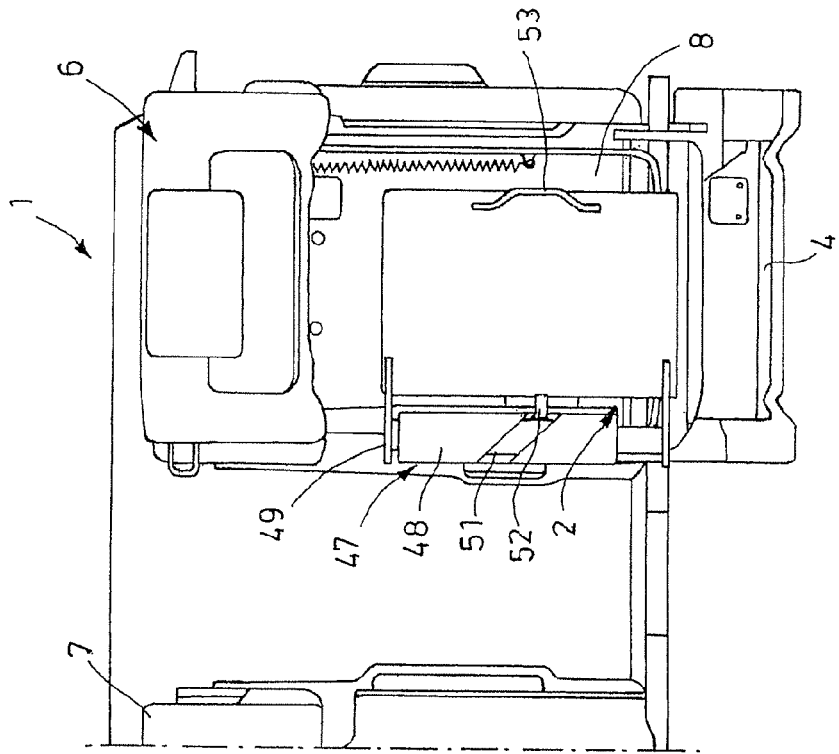
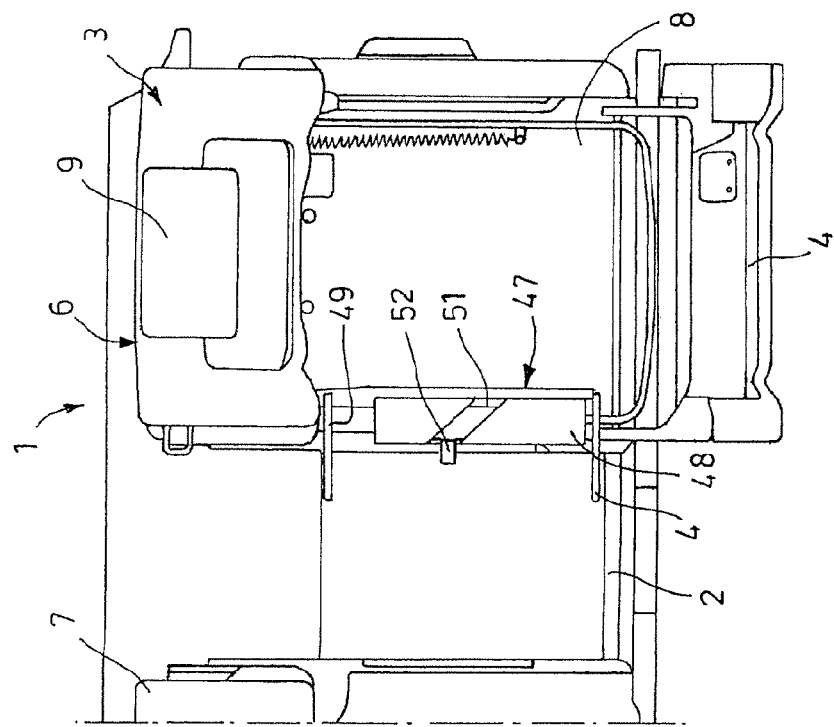

US 8,313,146 B2

STOWABLE VEHICLE SEAT

FIELD OF THE INVENTION

The invention generally relates to a seat, such as a central seat, for a vehicle comprising a back part and a seat part, which are connected to one another in a manner in which they may be swiveled relative to one another.

BACKGROUND OF THE INVENTION

In vehicles with seat rows made up of individual seats, frequently a generic additional seat is provided which may be stowed under or in an adjacent seat. For example, in vehicles with, in particular, a third rear seat row in the direction of travel, frequently two individual seats are arranged in a second seat row which are separated by a central aisle for reaching the third seat row. For increasing the number of seats in the vehicle, it is frequently provided that the generic seat may be arranged in the aisle between the seats of the second row in the seating position and may be stowed in or under an adjacent seat to the left or right.

One example of a central seat for a vehicle is disclosed in U.S. Patent Application Publication No. 2008/0185893 A1, which is hereby incorporated herein by reference. The seat has a back part and seat part that may be swiveled relative to one another. In the seating position the back part is located upright on the seat part, and in a first stowage position the back part is swiveled onto the seat part. So that the back part has the same stowage length as the seat part, the back part is shortened in the first stowage position. In the second stowage position, the seat is swiveled into a stowage space arranged underneath the adjacent seat. For this stowage process, a considerable operating effort is required overall.

It is desirable to provide a seat generally of the aforementioned type which may be stowed under or in the adjacent seat and which provides improved comfort and is safer.

SUMMARY OF THE INVENTION

According to one aspect of the present invention, a vehicle seat is provided that includes a back part and a seat part which are connected to one another in a manner in which they may be swiveled relative to one another and which are able to be swiveled between a seating position in which the back part and the seat part are swiveled away from one another, and a first stowage position, in which the back part and seat part are swiveled toward one another. The seat is able to be arranged with at least one stowage space and the back part is formed to be able to be altered at least in its longitudinal extent between the first stowage position and a second stowage position in which the seat is able to be moved to and fro at least partially in the stowage space. The back part is able to be longitudinally altered at least between a first end position in which the back part has a greater length configured as a seat length (si), and a second end position in which the back part has a shorter length configured as a stowage length (st). The seat further includes a traveling mechanism which automatically moves the back part from the first end position into the second end position when the back part is folded into the first stowage position.

According to another aspect of the present invention, a vehicle seat is provided. The vehicle seat includes a back part swivel connected to a seat part to swivel between a seating position and a first stowage position. The back part is movable longitudinally between a seat length and a shorter stowage length. The seat further includes a traveling mechanism which automatically moves the back part longitudinally from the seat length to the shorter stowage length when the back part is folded into the stowage position.

These and other aspects, objects, and features of the present invention will be understood and appreciated by those skilled in the art upon studying the following specification, claims, and appended drawings.

BRIEF DESCRIPTION OF DRAWINGS

In the drawings:

FIGS. 2a-2c show a schematic side view of the seat with the back part which is able to be folded up, the back part being located in FIG. 2a in a first end position and in FIGS. 2b and c in a second end position;

FIGS. 2d-2g show enlarged details Ito IV according to FIGS. 2a-2c;

FIG. 3 shows a schematic side view of the seat with a telescopable back part, the back part comprising a first upholstered part and being located in FIG. 3a in the first end position and in FIG. 3b in the second end position;

FIG. 4 shows a schematic front view of the telescopable back part with a plate-like component as a bearing part;

FIG. 5 shows a section according to the section line V-V in FIG. 4;

FIG. 6 shows a schematic side view of the seat with the telescopable back part in the first end position, the back part having a woven fabric;

FIGS. 7a and 7b respectively show a schematic side view of the seat with the telescopable back part in the first end position and/or in the second end position, the back part having a second upholstered part;

FIGS. 8a and 8b respectively show a schematic front view of the seat row with the seat comprising a locking device in the second end position and/or in the first end position;

FIG. 9 shows a schematic side view of the second seat with the locking receiver;

FIGS. 11a and 11b show a schematic side view of a receiver for a safety belt in a sliding position (FIG. 11a) and/or in a fixed position (FIG. 11b);

FIGS. 12a and 12b respectively show a schematic side view of the seat with the first swivel joint in the seating position and/or in the first stowage position;

FIGS. 13a and 13b respectively show a schematic side view of the seat with the first and a third swivel joint in the seating position and/or in the first stowage position;

FIGS. 16a and 16b respectively show a schematic plan view of a first embodiment of a guide for swiveling the seat between the first stowage position (FIG. 16a) and the second stowage position (FIG. 16b);

FIGS. 17a and 17b respectively show a schematic plan view of a second embodiment of the guide for swiveling the seat between the first stowage position (FIG. 17a) and the second stowage position (FIG. 17b);

FIGS. 18a and 18b respectively show a schematic plan view of the seat row with the guide in its second embodiment and with the seat in the first stowage position and/or in the second stowage position.

DETAILED DESCRIPTION OF PREFERRED EMBODIMENTS

Figure 1A:
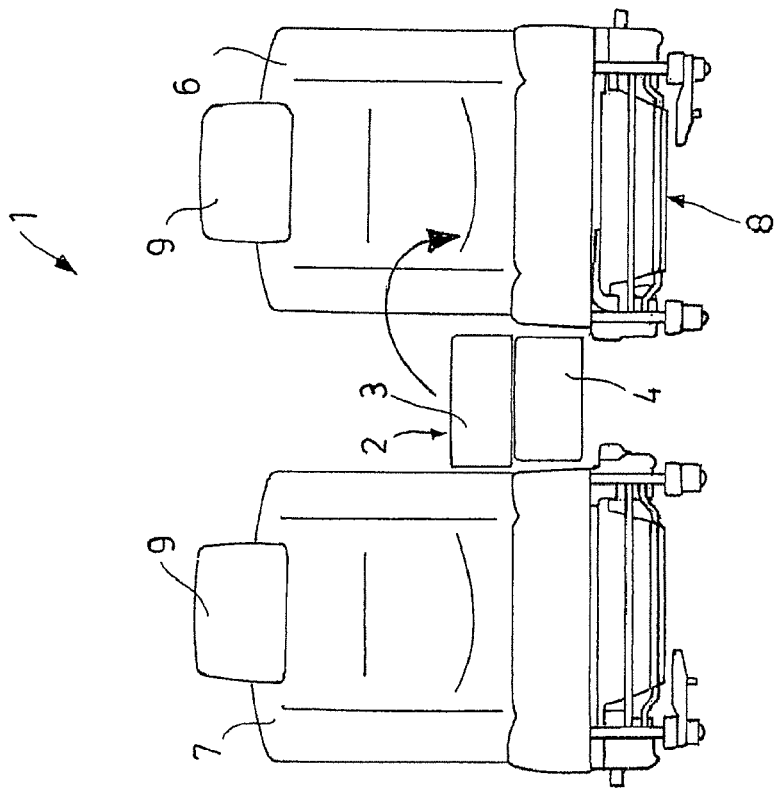
FIG. 1 shows a front view of a seat arrangement with a seat according to one embodiment arranged in this case centrally, the seat in FIG. 1a being shown folded up in a seating position, in FIG. 1b folded down in a first stowage position and in FIG. 1c folded down in a second stowage position.
Figure 1B:
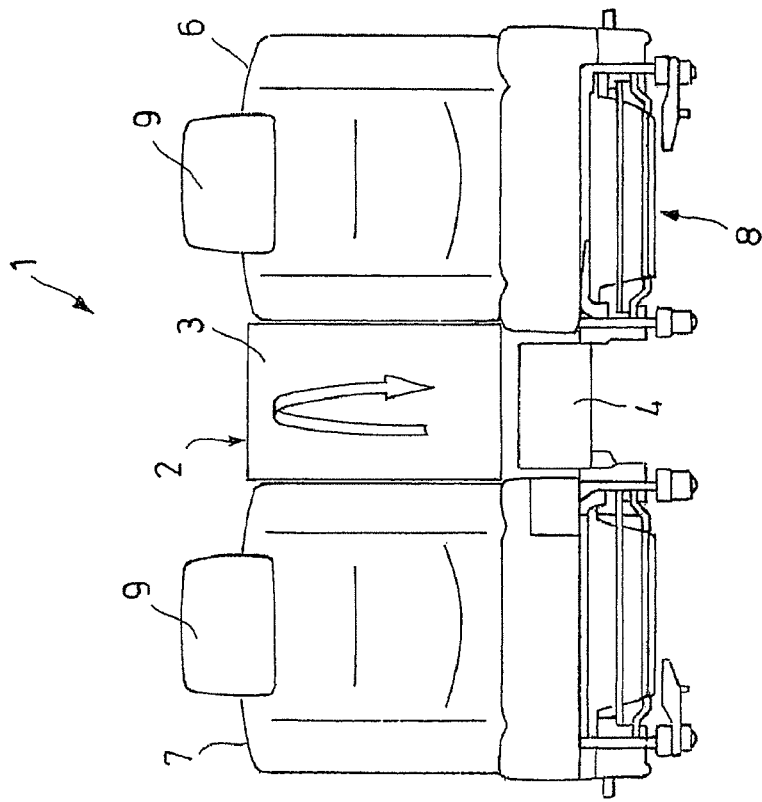
Figure 1C:
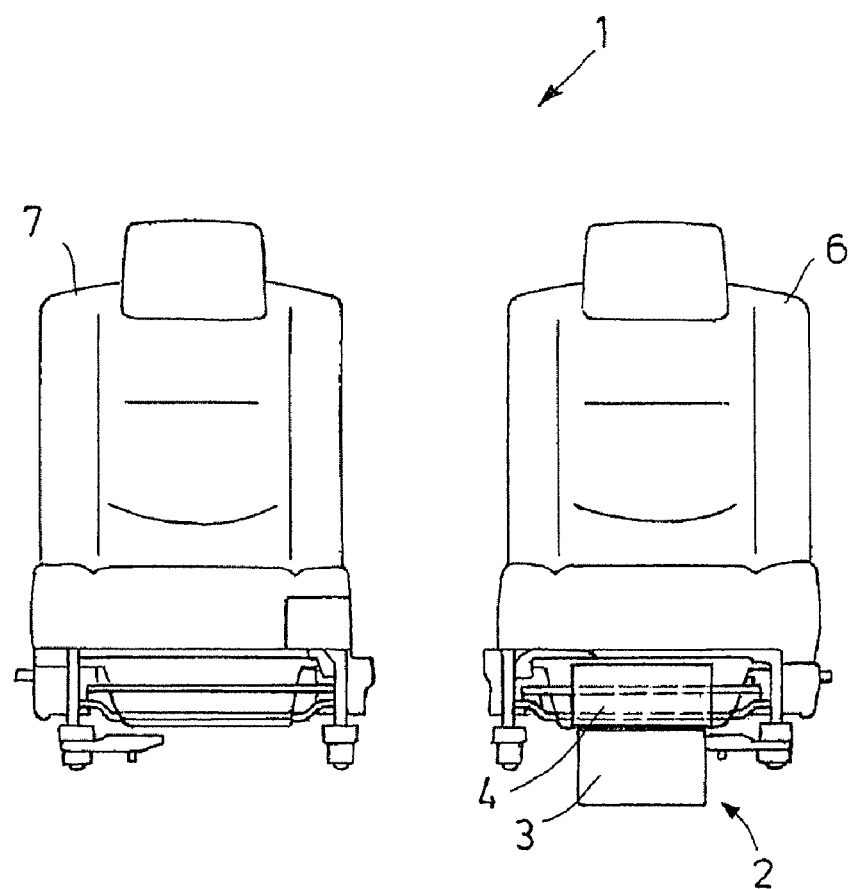
Figure 10A:
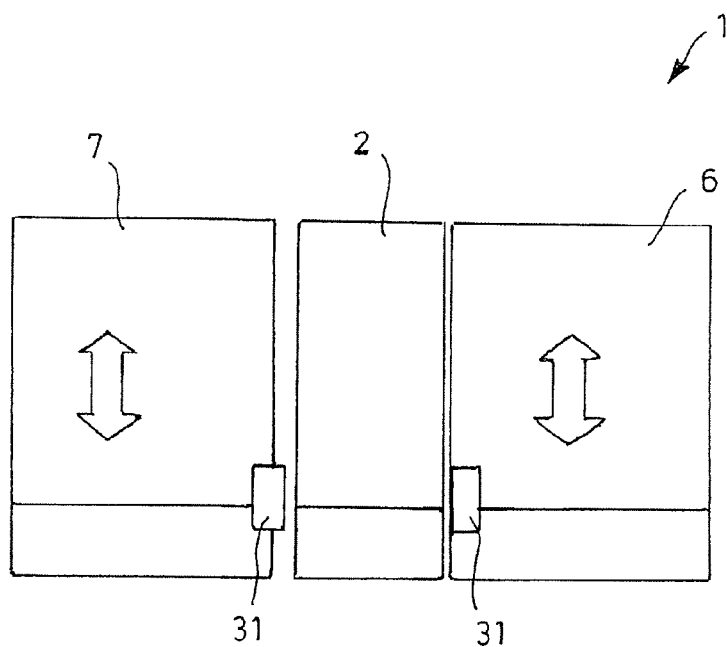
FIGS. 10a and 10b respectively show a schematic plan view of the seat row, the seat being located in a rear position in the direction of travel and/or in a front position in the direction of travel.
Figure 10B:
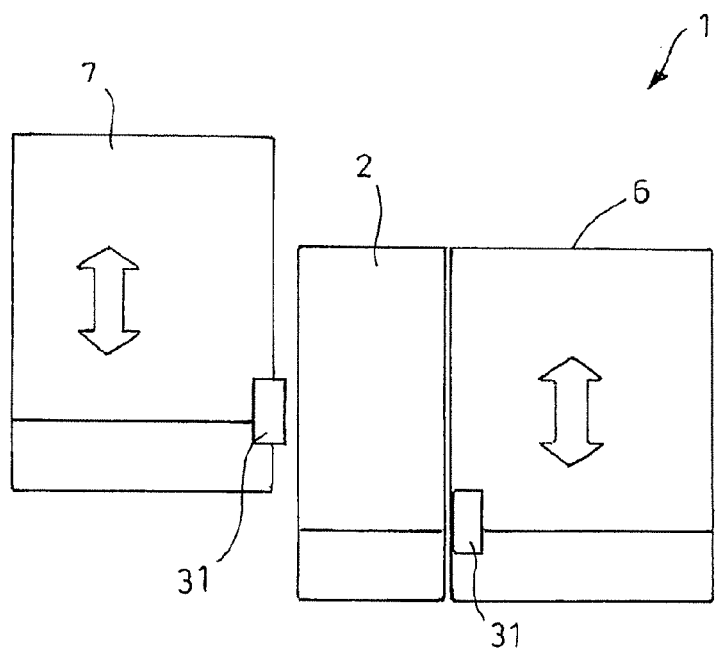

In FIGS. 1 to 19, respectively in a schematic view, a seat row 1 for a vehicle, not shown here, is shown in different embodiments and views as well as by means of details, sections and individual components or sub-assemblies of the seat row 1. The seat row 1 comprises a central seat 2 with a back part 3 and a seat part 4, which are connected to one another via a first swivel joint 5 about a first swivel axis s1 perpendicular to the longitudinal extent of the backrest 3 and the seat part 4 in a manner in which they may be swiveled relative to one another. The back part 3 and the seat part 4 may be swiveled between a seating position shown, for example, in FIGS. 1a, 6, 7a, 12a and 13a in which the back part 3 and seat part 4 are swiveled away from one another, and a first stowage position shown, for example, in FIGS. 12b and 13b, in which the back part 3 and seat part 4 are swiveled toward one another. The seat row 1 is arranged in the vehicle, facing in the direction of travel f, the central seat 2 in the seat row 1 being flanked by two further seats, a second seat 6 to the left in the direction of travel f and a third seat 7 to the right in the direction of travel f. The seat 2 is movable between the first stowage position and a second stowage position (for example FIG. 1c) in which the seat 2 is arranged in a stowage space 8 under the second seat 6.

The back part 3 is configured to be able to be altered at least in its longitudinal extent. To this end, the back part 3 is able to be longitudinally altered at least between a first end position, shown for example in FIG. 3a, in which the back part 3 has a greater length configured as the seat length si, and a second end position shown for example in FIG. 3b, in which the back part 3 has a shorter length configured as the stowage length st. For reducing the risk of injury in the event of an accident as well as for greater seating comfort the back part 3, possibly with an integrated headrest 9 (for example FIG. 3), and the seat part 4 should be adapted to human proportions. As the seat 2 in the stowage space 8 which is adapted in its longitudinal extent in the direction of travel f to that of the seat part 4 of the second seat 6 facing said seat part, is intended to be stowed, in conventional generic seats the longitudinal extent of their back parts is correspondingly small, so that such a seat has a back part which is too short per se and thus instead functions purely as an auxiliary seat. As a result of the possibility of longitudinal alteration of the back part 3 the back part may be moved to a required length.

By way of example, two different mechanisms for the possibility of longitudinal alteration of the back part 3 are proposed, a folding mechanism KM, by means of which the back part 3 may be folded down once or repeatedly, and a sliding mechanism S by means of which the back part 3 may be telescoped, said mechanisms also being able to be used in combination with one another.

In FIGS. 2a to 2c, the back part 3 for forming the folding mechanism K has a division of the back part 3 into two segments 3.1 and 3.2 with a dividing plane approximately perpendicular to the longitudinal extent of the back part 3 and, in FIGS. 2a to 2c, perpendicular to the drawing plane. Both segments 3.1 and 3.2 are connected via a second swivel joint 10 for the relative swiveling thereof about a second swivel axis s2 in the dividing plane and perpendicular to the longitudinal extent of the back part 3 and the seat part 4, the segments 3.1 and 3.2 in FIG. 2a, being arranged swiveled away from one another in the first end position and in FIG. 2b swiveled toward to one another in the second end position. In FIG. 2c, the seat 2 is arranged with the back part 3 and seat part 4 in the first stowage position swiveled toward one another.

A spring device 11 shown here purely schematically and a locking device 12 have the effect that the back part 3 may be folded against a spring force into the second end position and/or the back part 3 may be locked in the first end position and in the second end position. As a result, a greater operational safety in the handling and in the use of the seat 2 is achieved. The spring force in the second end position is sufficiently large that by means of said spring force the seat 2 may be moved automatically into the first end position. In FIGS. 2d to 2g, details Ito IV according to FIGS. 2a to 2c with one respective swivel joint 5, 10 are shown. In both swivel joints 5, 10 the spring force is produced respectively by a Bowden cable 13, which is connected in the second swivel joint 10 to the two segments 3.1, 3.2 (FIGS. 2d, 2e) and in the first swivel joint 5 (FIGS. 2f, 2g) to the back part 3 and seat part 4. For its directional deflection the Bowden cable 13 runs respectively over the periphery of a tension pulley 14 and is fastened with one end thereto. The Bowden cable is thus tensioned by the swiveling of the segments 3.1, 3.2 (FIGS. 2d, 2e) toward one another from the first end position into the second end position and/or by the swiveling of the lower segment in the figure against the seat parts 4.

As shown in FIG. 3, in a further embodiment of the seat 2 the back part 3 comprises two support elements 15 of a support frame 16, for forming the sliding mechanism (S) which are arranged in the longitudinal extent of the back part 3 and extend spaced apart from one another in parallel, as well as respectively to the side on the back part 3 and to the front in the direction of travel f, and which may be telescoped in a linear manner steplessly and in the longitudinal direction relative to one another between the first end position (FIG. 3a) and the second end position (FIG. 3b) in and/or counter to a sliding direction s. Not shown is a spring against which the back part 3 may be telescoped toward the second end position. With a relative swiveling of the back part 3 and seat part 4 toward one another into the first stowage position, also as in the above described embodiment of the back part 3 with two segments 3.1 and 3.2, a spring loaded pretensioning, in this case by means of a Bowden cable 13 may be produced. In order to clarify this, in addition to the reference numeral of the one segment 3.1, that of the back part 3 is used in FIGS. 2f and 2g.

With the telescoping of the back part 3 at the same time a bearing surface 17 for supporting a back of a user, not shown here, may be altered in its longitudinal extent. In the embodiments shown here of the telescopable back part 3, said back part has a first upholstered part 18, the longitudinal extent thereof being the same as the stowage length st of the back part 3. By displacing the back part 3 into the first end position, the bearing surface 17 has a gap 19, an additional bearing element 20 being provided for the bridging thereof, which is shown in different embodiments in the drawings.

In a first embodiment according to FIGS. 4 and 5, the bearing element 20 by way of example is configured as a plate-like component 21, which is arranged between the support elements 15 and, by means of which, displaceably held.

The plate-like component 21 comprises a central rigid plate 22 which is arranged in the installed position between the support elements 15 and which is defined on two opposing sides by one respective, in this case circular, open hollow profile 23 adapted to the profile of the support elements 15, (FIG. 5, a sectional view according to the section line V-V in FIG. 4), the hollow profile 23 partially encompassing in the installed position in the seat 2 the support element 15 associated therewith.

In a second embodiment, the bearing element 20 according to FIG. 6 is configured as a flexible woven fabric 24 spanning the gap 19, which acts on the seat part 4 and the back part 3.

In a third embodiment of the bearing element 20 shown in FIGS. 7a and 7b, said bearing element is configured as a second upholstered part 25, which in the first end position (FIG. 7a) bridges the gap 19, the first upholstered part 18 and the second upholstered part 25 being arranged displaceable in the longitudinal extent relative to one another. Not shown in the very schematic representation is the exact design of the two upholstered parts 18, 25 which, as described further above, may be configured to engage in one another in the manner of a wedge shape.

In the embodiments set forth, the back part 3 is able to be fixed in the first end position, the back part 3 being locked to this end to the second seat by means of a locking device 26. This is reproduced, by way of example, in FIGS. 8 and 9, said embodiment of the locking device 26 being suitable for a telescopable back part 3. The locking device 26 has a locking pin 27 which extends away laterally from the backrest 3 in a free end portion 28 remote from the seat part 4 in the first end position, and which engages in a locking manner in the first end position in a locking receiver 28 adapted thereto. To this end, the locking receiver 28 has a sliding surface 29 against which the locking pin 27 strikes in the seating position of the seat 2 and in its second end position (FIG. 8a) and a locking groove 30 which is U-shaped to the front and to the side in the sliding direction s and open in the sliding direction s. By the extension of the back part 3 from the second end position (FIG. 8a) into the first end position (FIG. 8b) the locking pin 27 slides counter to the sliding direction s on the sliding surface 29 into the locking groove 30 and strikes in the first end position the locking groove 30 at the bottom. In FIG. 9, the locking receiver 28 is shown schematically with the engaging locking pin 27 in the second end position and in the first end position. By means of this simple mechanism, in the first end position the locking pin 27 may absorb forces in and against the direction of travel f as well as counter to the sliding direction s. As a spring pretensioning is provided in the first end position with a force counter to the sliding direction s, the back part 3 is held in the locking groove 30 by means of the locking pin 27, even with small relative displacements of the back part 3 of the seat 2 and second seat 6, for example as a result of different swivel radii and/or swivel axes of the back parts of the two seats 2, 6 spaced apart from one another in the sliding direction s and/or in the direction of travel f.

With the coupling of the seat 2 and the second seat 6, receivers 31 which are provided are arranged on both sides on adjacent seats for a safety belt (FIG. 10a, a schematic plan view of the seat row 1), the safety belt respectively engaging via a lever 32. If the second seat 6—and thus the seat 2—is positioned in the direction of travel f differently from the third seat, i.e. being displaced to a different extent in the direction of travel f, there is the risk that the receivers 31 for the safety belt are also arranged offset relative to the direction of travel f, as FIG. 10b in a plan view of the seat row 1 demonstrates, whereby a correct force absorption via the safety belt in the event of an accident is no longer ensured. To remedy this, the receiver 31 connected to the second seat 6 is provided in a rail 33, into which the lever 32 is displaceably engaged in the direction of travel f. A Bowden cable 13 controlling the lever 32 acts in the rail 33 on the lever 32. With a displacement of the seat 6, the lever 32 may be altered in position via the Bowden cable 13, such that the levers 32 engage in receivers 31 at the same height relative to the direction of travel f. In the installed position on the upper side of the rail 33, a latching structure 34 is provided with stop surfaces 36 facing perpendicular to the lever direction. In the case of the action of a force F on the safety belt as a result, for example, of an accident, the attached lever 32 is guided via a transverse pin 35 arranged at the end, against the respectively associated stop surface 36 in this position, so that a force may be transmitted between the safety belt and the receiver 31.

In FIGS. 12a and 12b, for the relative swiveling of the back part 3 and the seat part 4 a conventional first swivel joint 5 is provided, the seat part 4 comprising a frame 16 with a connector piece 37 arranged at an obtuse angle α to the longitudinal extent of the seat part 4, on which the first swivel joint 5 is expediently arranged at the end due to the upholstery of the seat part 4, such that in the direction of the free end of the back part 3 it protrudes over the seat part 4. As a result, in the first stowage position the first swivel joint 5 protrudes disadvantageously for stowage, because as a result the required stowage space 8 has to be configured to be correspondingly large. An embodiment of the seat 2 improved in this regard is shown in FIGS. 13 to 15 in side views, in which a further swivel joint is provided configured as a third swivel joint 38 and acting preferably parallel to the first swivel joint 5, via which the connecting piece 37 is swivelably connected to the support frame 16 about a third swivel axis s4 parallel to the first swivel axis s 1 and which is able to be secured in the second stowage position.

Figure 14A:
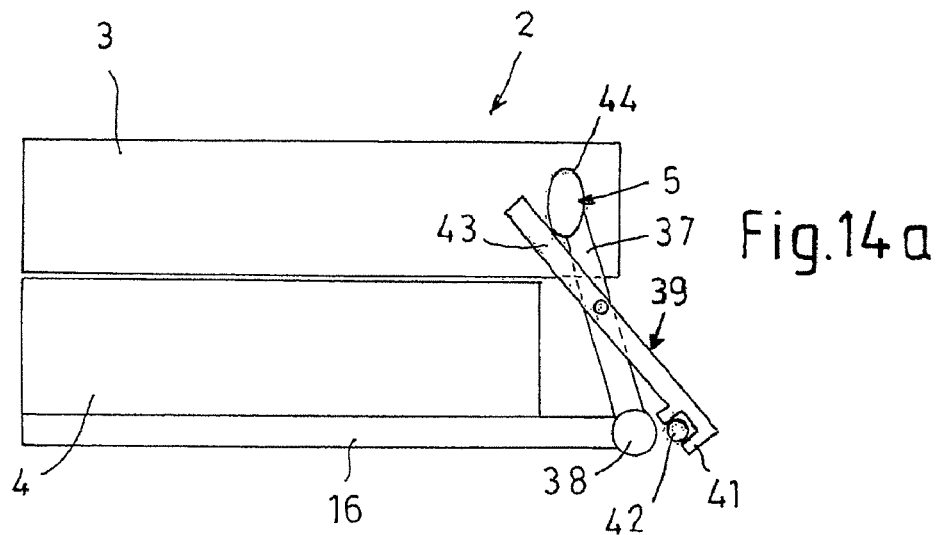
FIGS. 14a and 14b respectively show a schematic side view of the seat as in FIGS. 13a and 13b with a first embodiment of a blocking device.

For securing the third swivel joint 38 in the stowage position a locking lever 39 is provided which is coupled in the stowage positions and capable of locking and may be automatically uncoupled via a movement of the back part 3 relative to the seat part 4. The locking lever 39 is swivelably mounted centrally on the connecting piece acting as a swivel lever. With one end configured as a locking end 40 and provided with a claw 41, the locking lever 39 is coupled for locking the third swivel joint 38 to a pin formed as a locking pin 42 in a locked position (FIGS. 14a, 15a). A spring 42 provided and connected to the connecting piece pulls and secures the locking lever 39 in the locked position. The locking lever 39 is uncoupled via one free end formed as an actuating end 43. This may take place alternatively by means of two structures which are shown schematically in FIG. 14 and/or FIG. 15.

Figure 14B:
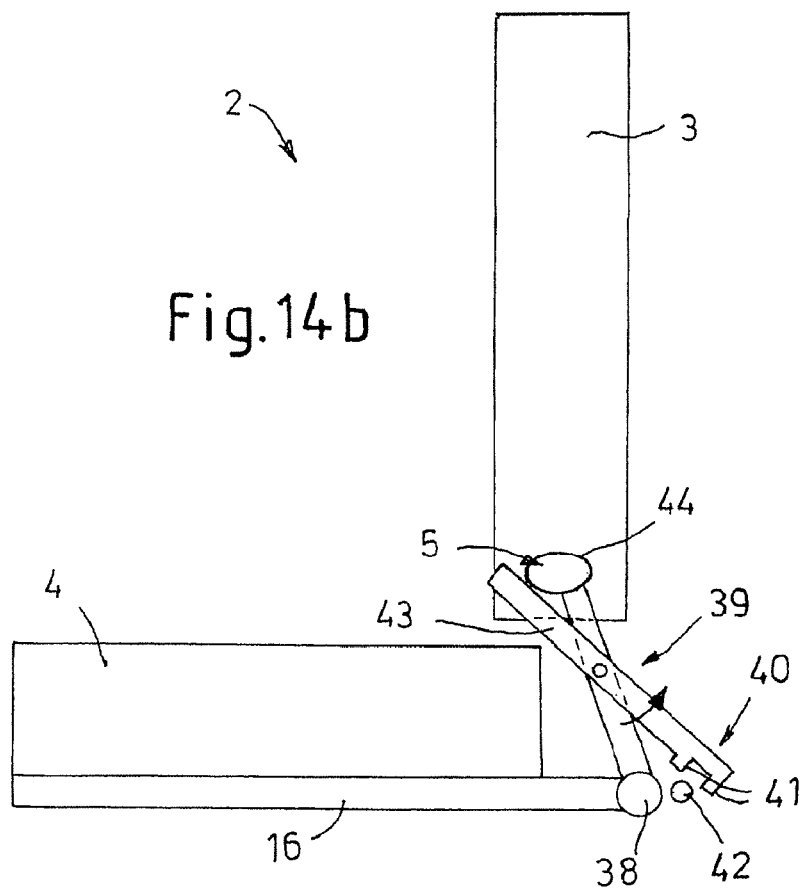
Figure 15A:
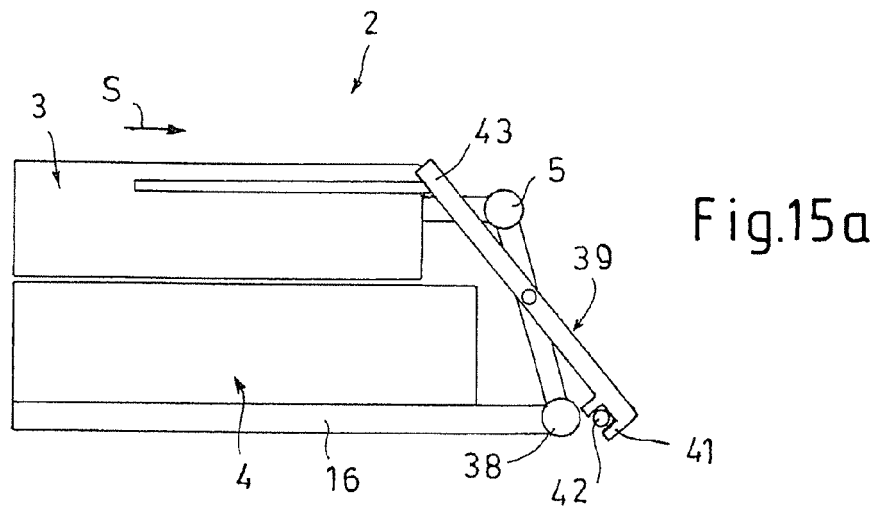
FIGS. 15a and 15b respectively show a schematic side view of the seat as in FIGS. 14a and 14b, with a second embodiment of a locking device.

As shown schematically in FIG. 14, the actuating end 43 acts on the periphery of a disk 44 with an oval contour which may be rotated about the first swivel axis s1 by the first swivel joint 5. According to FIG. 14a, the locking lever 39 bears in the seating position on a peripheral region of the disk 44 with a large diameter and is released with its locking end 39 from the locking pin 42. In the stowage positions according to FIG. 14b, the locking lever 39 bears against a peripheral region of the disk 44 with a small diameter and laterally encompasses the locking pin 42 with its claw 41, locking the third swivel joint 38.

Figure 15B:
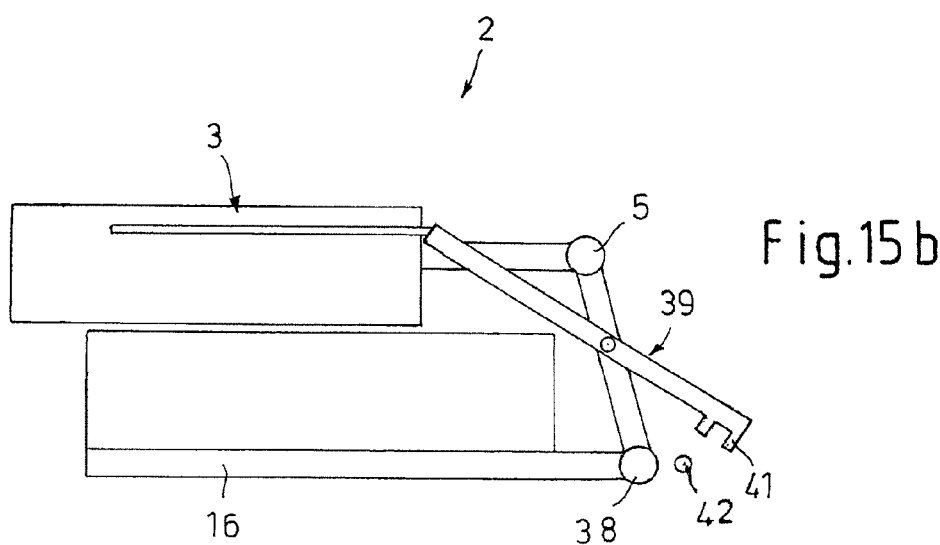

In FIGS. 15a and 15b a second embodiment of the locking lever 39 is shown. In contrast to the embodiment shown in FIGS. 14a and 14b, the locking lever 39 is connected with its actuating end 43 to the back part 4, in this case telescopable, such that it is actuated by a displacement of the back part 4 into the first end position, and uncoupled by its claw 41 from the locking pin 42.

In FIGS. 16 to 18 further embodiments of the seat 2 and/or the seat arrangement 1 are shown, in which the seat 2 may be moved from the first stowage position (FIGS. 16a, 17a and 18a) by swiveling by means of a fourth swivel joint 45 about a fourth swivel axis s4 and simultaneous displacement in the direction of translation t and/or, in the installed state, in the direction of travel f into the second stowage position (FIGS. 16b, 17b and 18b) and thus in a swiveling-translatory-motion. As a result, the seat 2 is displaced to the front in the stowage space 8 (FIG. 18), whereby a user, not shown, seated behind the second seat 6 in the direction of travel f may push his/her feet correspondingly far underneath the second seat 6, obtaining greater leg room. This movement takes place against a compression spring 46 shown only in FIG. 16, as a result of which the seat 6 may be moved in a movement in the opposite direction more easily from the second stowage position into the first stowage position. For the swiveling-translatory-motion a guide 47 is provided, which in this case by way of example is reproduced in two different embodiments. In both cases, the guide 47 has a guide sleeve 48 extending in the direction of translation t and/or in the installed state in the direction of travel f, which is connected fixedly to the second seat 6 comprising the stowage space 8, and is arranged coaxially over a lateral frame part 49 of the support frame 16 of the seat part 4.

In the first embodiment shown in FIGS. 16a and 16b the guide sleeve 47 and frame part 48 respectively bear against one another on a front face 50, which are arranged at an acute angle 13 in this case approximately 45°, to the longitudinal axis of the frame part 48 and/or of the seat part 4. By swiveling about the fourth swivel axis s4 by 180° the front faces 50 slide against one another, so that by carrying out the translatory movement of the seat 2 in the first stowage position (FIG. 16a) they bear flat against one another and in the second stowage position (FIG. 16b) only bear against the facing short portion or point.

In the second embodiment shown in FIGS. 17 and 18, the guide sleeve 48 has a radial guide slot 51 with a helical path, which is arranged coaxially and rotatably over the frame part 48. In the guide slot 51, a pin-like guide projection 52 with a circular cross section is guided, which is arranged on the lateral frame part 49 of the seat part 4 and extends to the side thereof. By swiveling the seat 2 by approximately 180°, said seat is simultaneously displaced in the direction of travel f over the guide projection 52 guided in the guide slot 51. On the underside of the seat part 4 of the seat 2 facing upwards in the second stowage position a handle 53 is provided for handling the seat, when manually displaced into the second stowage position and/or out of said second stowage position.

Figures 19A, 19B:
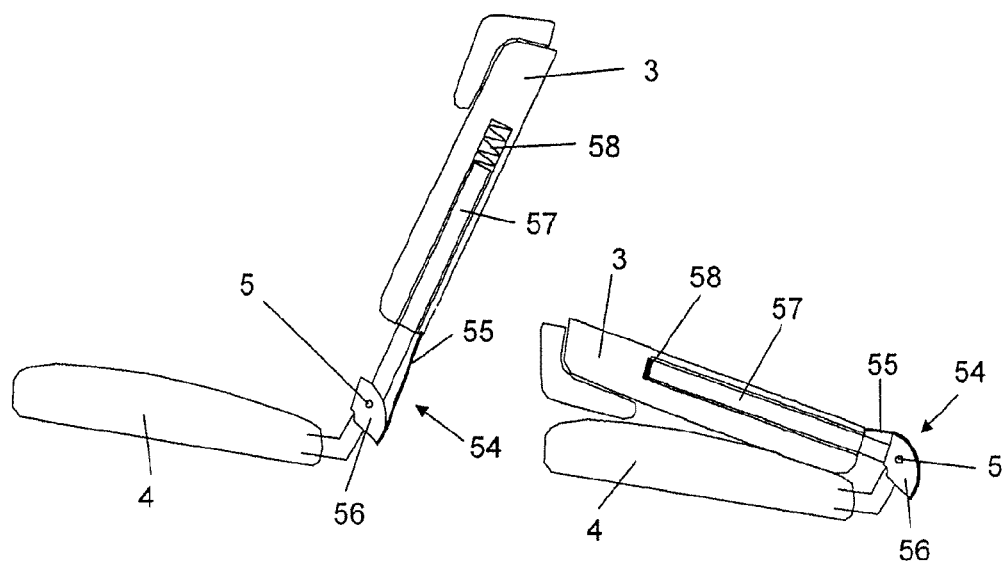
FIGS. 19a and 19b respectively show a schematic side view of the seat with an automatic traveling mechanism for the back part.

In the seat in FIGS. 19a and 19b a conventional first swivel joint 5 is provided for the relative swiveling of the back part 3 to the seat part 4. The seat comprises a traveling mechanism 54 which is arranged in the region of the first swivel joint 5, and which contains a cable pull 55, which connects the back part 3 and seat part 4. The back part 3 is mounted on guide rails 57 and may be relatively moved thereon, in relation to the first swivel joint 5.

When folding down the back part 3, the cable pull 55 is wound up on a circular segment disk 56 fastened to the seat part 4, and thus pulls the back part in the direction of the first swivel joint 5. Thus, the back part is automatically moved from the first end position into the second end position, when the back part is folded into the first stowage position. When folded in, the cable pull operates counter to the compression springs 58 arranged in the guide rails 57. When folding up the back part 3, the compression springs 58 force the backrest 3 upwards, so that said back part 3 automatically moves into the first end position.

The traveling mechanism 54 thereby automatically moves the back part 3 from the first end position into the second end position when the back part 3 is folded into the first stowage position. In the embodiment shown, the traveling mechanism 54 employs the cable pull 55 which winds up on a circular segment disk 56 to pull the back part 3 in the direction of the first swivel joint 5 to automatically move the back part 3 from the first end position and into the second end position when the back part 3 is folded into the first stowage position. Thus, the traveling mechanism automatically moves the back part longitudinally from the seat length to the shorter storage length when the back part is folded into the stowage position, and automatically moves the back part longitudinally from the shorter stowage length to the upright seat length when the back part is unfolded into the seat position.

It should be appreciated that the traveling mechanism 54 may otherwise be embodied to automatically move the back part 3 from the first end position into the second end position when the back part 3 is folded into the first stowage position. According to other embodiments, the traveling mechanism 54 may employ other linkages including one or more rigid linkages, such as one or more pins that travel within cammed surfaces to effect the longitudinal alteration of the seat back 3 when the back part 3 is folded into the first stowage position and unfolded back into the seat position. Additionally, it should be appreciated that the traveling mechanism 54 may be employed on various other seat embodiments shown and described herein, including the embodiments of FIGS. 2, 3 and 6, and conceivably may be employed in other seat embodiments.

Accordingly, the seat comprises a traveling mechanism which automatically moves the back part from the first end position into the second end position, when the back part is folded into the first stowage position, and thus the operation is substantially simplified for the user. The user now no longer first has to shorten the back part laboriously in two steps, nor move it into the second end position and then swivel it round, but a swiveling movement of the back part is now sufficient in order to move the back part simultaneously into the second end position. Any driving connection between the seat part and the back part is suitable as a traveling mechanism, which when folding in the back part causes a corresponding longitudinal displacement or swiveling movement of the back part.

Advantageously, the back part moves against mechanical stored energy, in particular against a mechanical spring force from the first end position into the second end position. Thus, mechanical energy is stored, in particular mechanical spring energy. During the lengthening of the back part, this stored energy is used, by assisting this movement, whereby the movement of the backrest from the second end position into the first end position is substantially facilitated. Moreover, for reducing the size of the back part an additional force has to be used, so that as a result, a first securing measure for holding the back part in the first end position is also provided. Preferably, mechanical pretensioning is provided in the first end position.

In an embodiment of the seat with a traveling mechanism, the back part, which is guided on guide rails, moves against a compression spring when folded-in. When folding out the back part no force then has to be applied by the user for extending the back part.

According to one embodiment, the traveling mechanism has a cable pull, which connects the back part and seat part, the cable pull when folding down the back part being wound onto a circular segment disk fastened to the seat part. Advantageously the circular segment disk is arranged on the first swivel joint. When folding in the back part, the cable pull which is being wound up pulls the seat part in the direction of the first swivel joint, whereby said automatic longitudinal displacement of the back part is affected.

For storing the mechanical energy, a Bowden cable may be provided in one embodiment which is respectively connected at the ends to the back part and the seat part, and which may be tensioned by the swiveling of the back part against the seat part into the first stowage position. In this connection, the Bowden cable may be at least slightly pretensioned in the seating position. Advantageously, for its deflection from one direction in the longitudinal extent of the back part the Bowden cable is guided in the longitudinal extent of the seat part over the periphery of a preferably circular deflection pulley which is arranged on the back part and/or the seat parts and with its central axis parallel to the swivel axis. The deflection pulley may, to this end, have a peripheral deflection groove in which the Bowden cable is expediently guided in a secure manner against slipping to the side.

It is to be understood that variations and modifications can be made on the aforementioned structure without departing from the concepts of the present invention, and further it is to be understood that such concepts are intended to be covered by the following claims unless these claims by their language expressly state otherwise.

We claim:

1. A vehicle seat comprising:
a back part and a bottom part which are connected to one another in a manner in which they may be swiveled relative to one another and which are able to be swiveled between a seating position in which the back part and the bottom part are swiveled away from one another, and a first stowage position, in which the back part and bottom part are swiveled toward one another, the seat positioned adjacent to at least one stowage space and the seat configured to move between the first stowage position and a second stowage position in which the seat is able to be moved to and fro at least partially in the stowage space, the back part being able to be longitudinally altered at least between a first end position in which the back part has a greater length configured as a seat length, and a second end position in which the back part has a shorter length configured as a stowage length;
a traveling mechanism which automatically moves the back part from the first end position into the second end position when the back part is folded into the first stowage position; and
a guide connected between the stowage space and the bottom part of the seat, wherein the guide is configured to swivel the seat between the first and second stowage positions, such that the seat is simultaneously displaced in a direction of travel of the vehicle, and wherein the seat is adjacent to at least one second seat of a seat row, and wherein the stowage space is arranged underneath or in the adjacent second seat.

2. The seat as defined in claim 1 further comprising a mechanical energy storage device, wherein the back part may be moved against the energy storage device from the first end position into the second end position to store energy, and wherein the energy storage device comprises a spring, such that the stored energy is released from the spring as a spring force when the back part is moved from the second end position to the first end position.

3. The seat as defined in claim 1, wherein the back part comprises a folding mechanism by means of which the back part may be folded down at least once to longitudinally alter the back part from the first end position to the second end position.

4. The seat as defined in claim 1, wherein the back part comprises a sliding mechanism by means of which the back part slides in a linear manner to longitudinally alter the back part between the first end position and the second end position.

5. The seat as defined in claim 4, wherein the back part comprises two support elements which are arranged in the longitudinal extent and extending spaced apart from one another in parallel, as well as respectively to the side, and wherein the support elements are displaceable in a linear manner for forming the sliding mechanism in the longitudinal direction relative to one another between the first end position and the second end position.

6. The seat as defined in claim 5, wherein the sliding mechanism telescopes steplessly to longitudinally alter the back part from the first end position to the second end position, and wherein the support elements respectively comprise two tubular hollow profile portions, which may be guided inside one another in a telescopable manner.

7. The seat as defined in claim 1, wherein the traveling mechanism moves the back part, which is guided on guide rails, against a compression spring when the back part slides from the first end position to the second end position and when the seat is folded-in from the seating position to the first stowage position.

8. The seat as defined in claim 1, wherein the traveling mechanism comprises a cable which connects the back part and bottom part, and wherein the cable pull when folding down the back part from the seating position to the first stowage position is wound on a circular segment disk fastened to the bottom part to pull the back part from the first end position to the second end position.

9. The seat as defined in claim 1, wherein the back part may be fixed in one of the first end position and in the second end position.

10. The seat as defined in claim 1, wherein by swiveling the back part against the bottom part about a first swivel axis perpendicular to the longitudinal extent of the back part and of the bottom part against mechanical stored energy provided by a mechanical spring force, the seat may be moved from the seating position into the first stowage position and may be secured in the first stowage position.

11. The seat as defined in claim 10 further comprising a Bowden cable for producing the mechanical stored energy which is respectively connected at the ends to the back part and the bottom part and which may be tensioned by swiveling the back part against the bottom part, wherein the back part of the seat is integrated with a headrest.

12. The seat as defined in claim 1, wherein the at least one second seat includes a second bottom part and the stowage space is arranged below the second bottom part, in which the seat may be stowed in the second stowage position and wherein the second bottom part is configured to be folded up to reveal the stowage space to move the seat in or out of the second stowage position.

13. The seat as defined in claim 12, wherein the seat is a center seat located between the at least one second seat and a third seat.

14. A vehicle seat comprising:
a back part and a bottom part which are connected to one another in a manner in which they may be swiveled relative to one another and which are able to be swiveled between a seating position in which the back part and the bottom part are swiveled away from one another, and a first stowage position, in which the back part and bottom part are swiveled toward one another, the seat positioned adjacent to at least one stowage space and the seat configured to move between the first stowage position and a second stowage position in which the seat is able to be moved to and fro at least partially in the stowage space, the back part being able to be longitudinally altered at least between a first end position in which the back part has a greater length configured as a seat length, and a second end position in which the back part has a shorter length configured as a stowage length, a traveling mechanism which automatically moves the back part from the first end position into the second end position when the back part is folded into the first stowage position; and a guide connected between the stowage space and the bottom part of the seats, wherein the guide is configured to swivel the seat between the first and second stowage positions, such that the seat is simultaneously displaced in a direction of travel of the vehicle, and wherein the guide has a guide sleeve with a radial guide slot having a helical path, and wherein a projection extends from the bottom part of the seat into the guide slot, such that when the seat swivels about an axis of the guide between the first and second stowage positions the projection moves in the guide slot and displaces the seat forward in the direction of travel.

15. A vehicle seat comprising:

a back part and a bottom part which are connected to one another in a manner in which they may be swiveled relative to one another and which are able to be swiveled between a seating position in which the back part and the bottom part are swiveled away from one another, and a first stowage position, in which the back part and bottom part are swiveled toward one another, the seat positioned adjacent to at least one stowage space and the seat configured to move between the first stowage position and a second stowage position in which the seat is able to be moved to and fro at least partially in the stowage space, the back part being able to be longitudinally altered at least between a first end position in which the back part has a greater length configured as a seat length, and a second end position in which the back part has a shorter length configured as a stowage length, a traveling mechanism which automatically moves the back part from the first end position into the second end position when the back part is folded into the first stowage position; and a guide connected between the stowage space and the bottom part of the seat, wherein the guide is configured to swivel the seat between the first and second stowage positions, such that the seat is simultaneously displaced in a direction of travel of the vehicle, and wherein the back part may be fixed in one of the first end position and in the second end position, and wherein the back part comprises a locking device for locking the back part to a locking receiver of a second seat when the seat is in the seating position, and wherein the locking device has a pin extending from the back part to engage the locking receiver, such that the pin may slide in the locking receiver when the back part moves between the first end position and the second end position.

16. The seat as defined in claim 15, wherein the seat is adjacent to at least one second seat of a seat row, and wherein the stowage space is arranged underneath or in the adjacent second seat.

17. A vehicle seat comprising:

a back swivel-connected to a bottom to swivel between a seating position and a first position, where the back swivels to abut the bottom;

a traveling mechanism which automatically shortens a length of the back when the back swivels to the first position; and a guide swivel-connecting the bottom to a laterally adjacent seat to laterally swivel and simultaneously rearwardly displace the vehicle seat to a stowage space in the laterally adjacent seat.

18. The vehicle seat as defined in claim 17, wherein the back of the seat is integrated with a headrest, and wherein the seat laterally swivels about the guide from the first position at least partially into the space in the laterally adjacent seat, defining a second position.

19. The vehicle seat as defined in claim 18, wherein the guide has a guide sleeve with a radial guide slot having a helical path, and wherein a projection extends from the bottom of the seat into the guide slot, such that when the seat swivels about an axis of the guide between the first and second positions the projection moves in the guide slot and displaces the seat rearward in the direction of travel.

* * * * *